United States Patent
Burton (10) Patent No.: US 9,555,665 B2
(45) Date of Patent: Jan. 31, 2017

(54) BICYCLE SPINNER MOUNTING

(71) Applicant: Michael Burton, Detroit, MI (US)

(72) Inventor: Michael Burton, Detroit, MI (US)

( * ) Notice: Subject to any disclaimer, the term of this patent is extended or adjusted under 35 U.S.C. 154(b) by 324 days.

(21) Appl. No.: 14/477,124

(22) Filed: Sep. 4, 2014

(65) Prior Publication Data

US 2015/0069820 A1 Mar. 12, 2015

Related U.S. Application Data

(60) Provisional application No. 61/960,181, filed on Sep. 9, 2013.

(51) Int. Cl.
  *B60B 7/20* (2006.01)
  *B60B 7/00* (2006.01)
  *B60B 7/06* (2006.01)
  *B60B 7/04* (2006.01)

(52) U.S. Cl.
  CPC .............. *B60B 7/20* (2013.01); *B60B 7/0006* (2013.01); *B60B 7/066* (2013.01); *B60B 7/04* (2013.01); *B60B 2900/113* (2013.01)

(58) Field of Classification Search
  CPC ............... B60B 7/20; B60B 7/06; B60B 7/066
  USPC ......................... 301/37.25, 37.102, 37.106
  See application file for complete search history.

(56) References Cited

U.S. PATENT DOCUMENTS

| | | | |
|---|---|---|---|
| 4,121,851 A | 10/1978 | Finkenbiner | |
| 6,899,400 B1* | 5/2005 | Cook | B60B 7/20 |
| | | | 301/37.25 |
| 7,086,706 B1 | 8/2006 | Wood | |
| 7,226,132 B2 | 6/2007 | Fultz et al. | |
| 7,347,503 B2* | 3/2008 | Raddin | B60B 7/0006 |
| | | | 301/37.25 |
| 7,427,110 B2 | 9/2008 | Miansian et al. | |
| 7,628,417 B2 | 12/2009 | Will et al. | |
| 2002/0036426 A1 | 3/2002 | Fowlkes | |
| 2005/0231023 A1* | 10/2005 | Smith | B60B 3/082 |
| | | | 301/37.25 |
| 2006/0061207 A1* | 3/2006 | Kessler | B60B 7/0006 |
| | | | 301/37.25 |
| 2006/0087171 A1* | 4/2006 | Riley | B60B 7/0006 |
| | | | 301/37.25 |

* cited by examiner

*Primary Examiner* — Jason Bellinger
(74) *Attorney, Agent, or Firm* — John R. Benefiel (57) ABSTRACT

A bicycle wheel spinner which is quickly and easily released from a hub and has an inner ring formed segments, with blades protruding from each segment. The segments each mount a roller wheel riding in a groove in a supporting hub. The segments are releasably fixed together in the groove. The spinner can be quickly removed by disassembling the inner ring segments. A locking mechanism allows the spinner to be locked to the hub or released to rotate independently.

4 Claims, 7 Drawing Sheets

BICYCLE SPINNER MOUNTING

CROSS REFERENCE TO RELATED APPLICATIONS

This application claims the benefit of U.S. provisional application No. 61/960,181 filed on Sep. 9, 2013.

BACKGROUND OF THE INVENTION

This invention concerns so called "spinners" for bicycle wheels. Such spinners are ornamental propeller like blades projecting from an inner ring attached to a spinner hub mounted on an existing hub of a bicycle wheel. The spinner may be mounted to rotate with the bicycle wheel or to rotate independently thereof.

It is advantageous to be able to quickly install a spinner without disassembling the bicycle hub as to be able to conveniently install spinners of different appearances.

It has heretofore been proposed to segment the spinner hub so as to allow assembly onto the bicycle hub, as described in U.S. Pat. Nos. 7,628,417 and 7,086,706. The '417 patent shows a complex hub configuration involving end caps and radial bearings which must be installed to retain the spinner, and are time consuming to install.

If a series of spinners are to be installed and changed over at short intervals, there is a need to allow a quick change thereof. U.S. Pat. No. 7,086,706 features a loose fitting spinner hub which is driven by a connection to a wheel spoke. Such loose fit causes impacts with the spokes and could damage or destroy the spinner and spokes. Free spinning would be problematic.

Another feature which would be desirable in such spinner installation is to quickly and easily change the drive to the spinner, i.e. from a fixed relationship with the bicycle wheel hub to one in which relative rotation is possible to create different visual effects produced by spinner rotation.

Accordingly, it is an object of the present invention to provide a spinner mounting which allows ready removal of a spinner and replacement with another of the spinner.

It is a further object of the invention to enable a ready varying relationship of the movement of the spinner with that of the bicycle hub.

SUMMARY OF THE INVENTION

The above recited objects of the invention and other objects which will be understood by those skilled in the art upon a reading of the following specification and claims are achieved by a spinner mounting arrangement including a two piece hub which may configure to be assembled over the existing bicycle wheel hub and held together as by the use of fasteners securing the two pieces together. The assembled spinner hub has a continuous peripheral groove in is exterior.

The hub may also be a specially configured bicycle wheel hub having the groove formed therein.

The spinner itself includes an inner ring with a circular array of radial blades projecting therefrom. The inner ring is made up of multiple segments held together to form the complete inner ring as by providing matching radial slots along sides of the fit together segments and also mating key pieces inserted radially into the slots or by screws securing together overlapping adjacent portions of the ring segments.

The ring segments each have one or more wheels mounted so as to project radially inward into the hub groove. This engagement of the wheels in the hub groove secures the spinner on the hub without the need for removal any bearings, end caps, etc., to make removal of the spinner quick and easy. Simply disconnecting the segments, the wheels can be withdrawn from the groove to disconnect and remove the spinner segments. In the keyed version, removal of the keys with the fingers allows separation of the ring segments and removal of the spinner.

In the screw together version simply by removal of the screws, the wheel son the segments can be withdrawn from the groove and the spinner thus dismounted.

The spinner hub may be made to be adapted to bicycle hubs of a range of diameters by providing a series of deflectable fingers projecting radially inward from the spinner hub bore which are compressed as necessary to fit the spinner hub bore to the outside diameter of the bicycle wheel hub.

Another alternative is to form the bicycle wheel itself with a groove to eliminate the need for a separate spinner hub.

The spinner inner ring may be provided with a slidable locking element, which can alternatively be moved to an advanced position engaging the hub and locking the spinner to the hub to cause the spinner to rotate with the bicycle wheel, or to be withdrawn and allow the spinner to rotate independently of the bicycle wheel.

The spinner blades are each preferably provided with a lengthwise projecting feature which is configured to catch the wind and thereby rotate the spinner independently from the bicycle wheel.

The projecting features may also be hollow and filled with a weighting material to increase their momentum when spinning, so as to keep the spinner spinning for a longer period after the bicycle wheel is stopped or slowed.

Alternatively, the blades can be twisted or curved to be rotated by the wind passing over the blade.

A single blade can be weighted to tend to hold the spinner stationary as the bicycle wheel rotates, if the spinner is decoupled from the hub.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
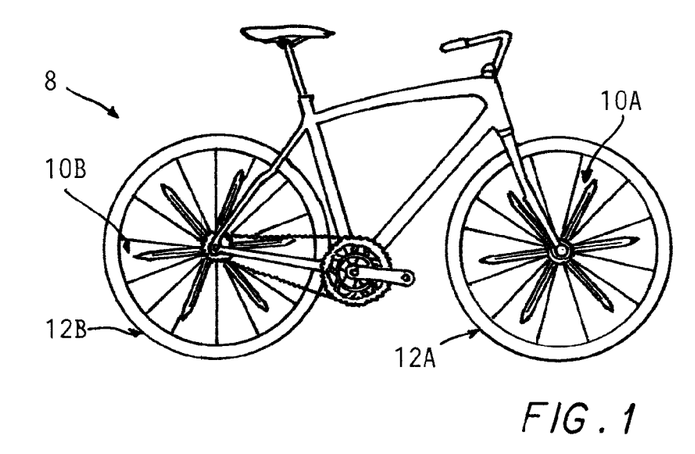
FIG. 1 is a side view of a bicycle having spinners according to one embodiment of the invention installed on the front and rear wheels.

Referring to the drawings, FIG. 1 shows spinners 10A, 10B attached to the hub of front wheel 12A and a rear wheel 12B respectively of a bicycle 8.

The spinners 10A, 10B are both comprised of a series of blades 14 projecting from an inner ring 16 which in turn is mounted on a spinner hub 18 adapted to be received over a bicycle wheel hub as described hereinafter.

Figures 2, 2A:
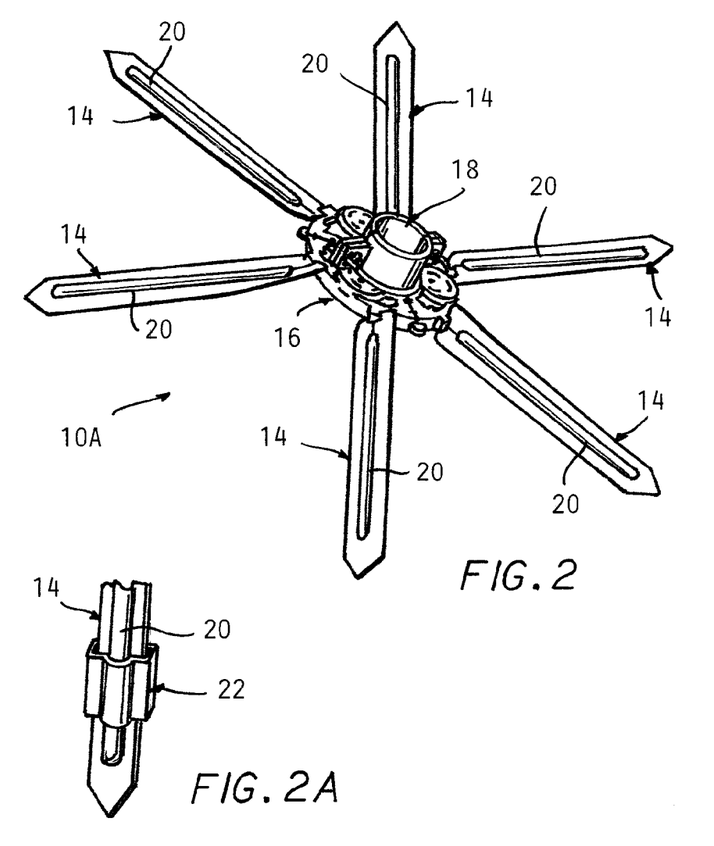
FIG. 2 is an enlarged pictorial view of a spinner shown in FIG. 1.
FIG. 2A is a fragmentary pictorial view of a blade having an optional weight installed.

The blades 14 can be flat with raised lengthwise features here comprised of ribs 20 which can optionally be hollow and filled with weighting material such as shot to increase the mass thereof. The ribs 20 better catch the wind, which is important when the spinner is released and able to rotate free of the bicycle wheel hub.

A single weight 22 (FIG. 2) can be installed on one blade 14 to cause the spinner 10A, 10B to not rotate or multiple weights could be installed, one on each blade 14 to increase the angular momentum of a spinner when spun to extend the period that the spinner will continue spinning after the bicycle wheel on which it is mounted is stopped.

Figure 3:
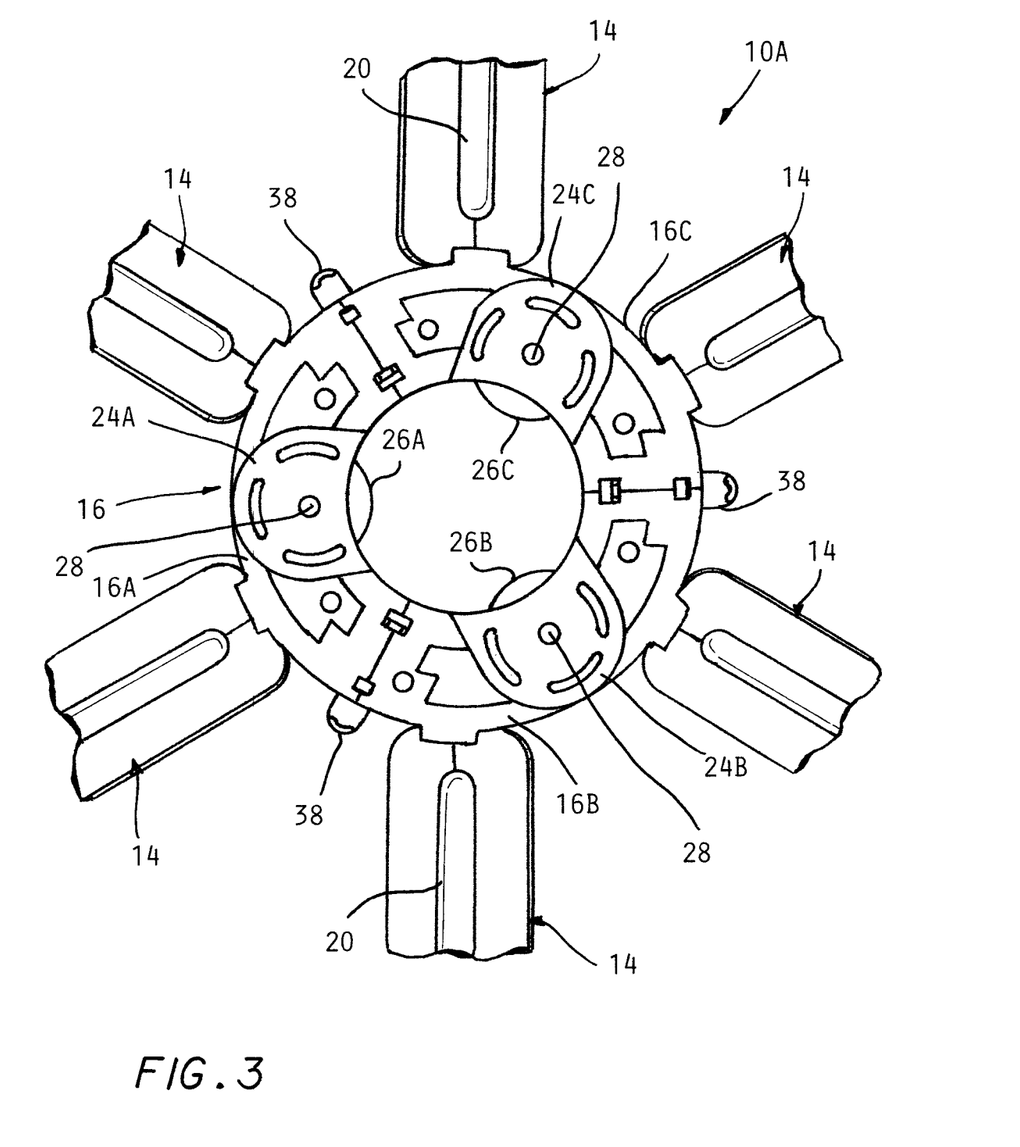
FIG. 3 is enlarged fragmentary end view of the spinner shown in FIG. 2, without the spinner hub and with the blades broken away.
Figure 4:
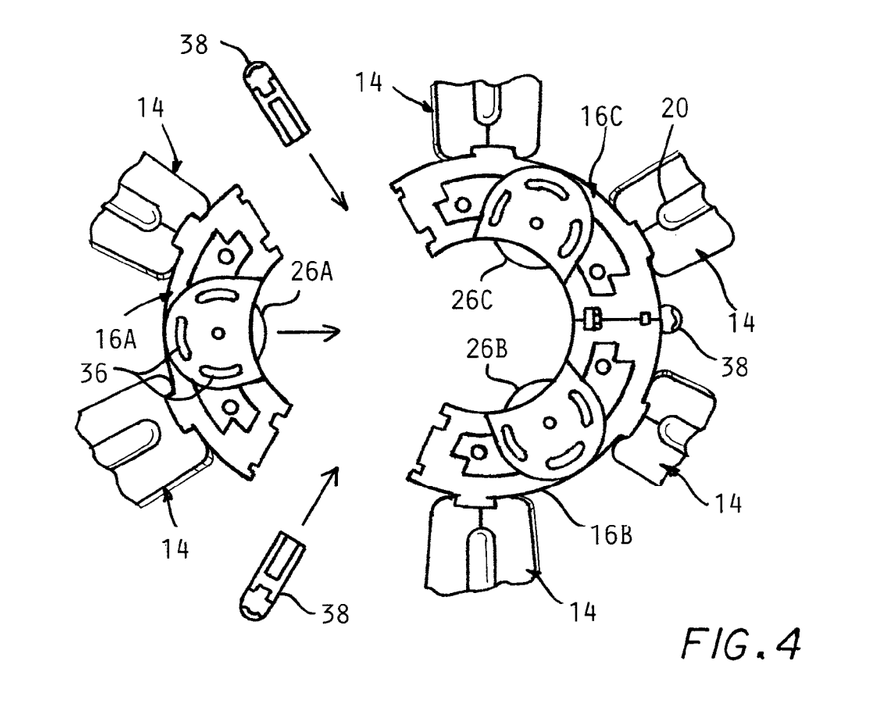
FIG. 4 is a fragmentary end view of the segments of the spinner shown in FIG. 3 partially exploded.
Figure 5:
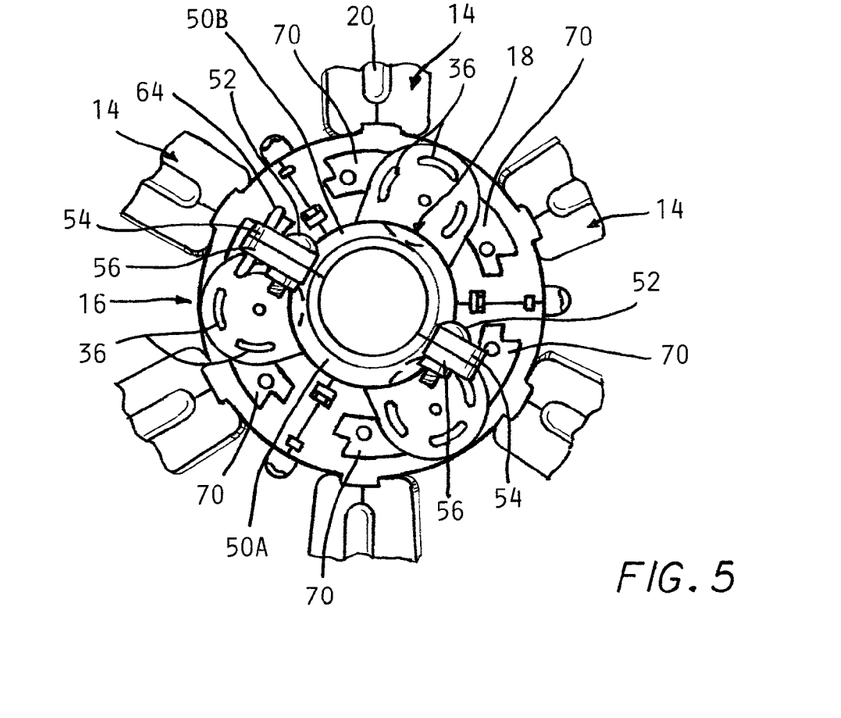
FIG. 5 is a fragmentary end view of the spinner shown in FIGS. 3 and 4 installed onto a spinner hub.

The inner ring 16 is comprised of multiple segments, such as the three segments 16A, 16B, 16C shown in FIGS. 3, 4 and 5. Each inner ring segment 16A-16C can be molded of a tough plastic such as nylon, with two blades 14 integral with each segment 16A-16C as shown.

Each ring segment 16A-16C has a partially circular chamber 24A-24C formed thereon receiving a respective roller wheel 26A-26C with a pin 28 at each center to secure the roller wheels 26A-26C and to rotatably mount the same within a respective chamber 24A-24C.

Figure 5A:
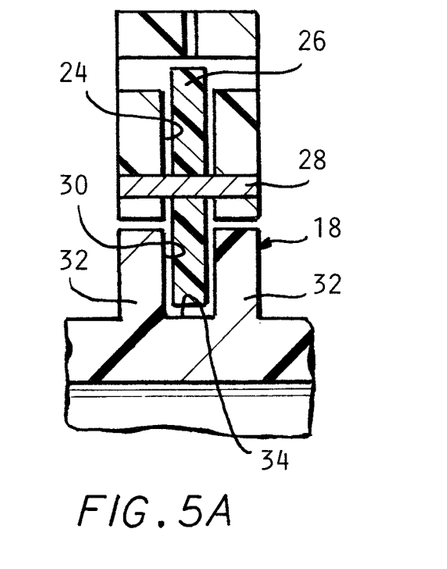
FIG. 5A is an enlarged fragmentary sectional view of a portion of the spinner showing one of the spinner wheels.
Figure 5B:
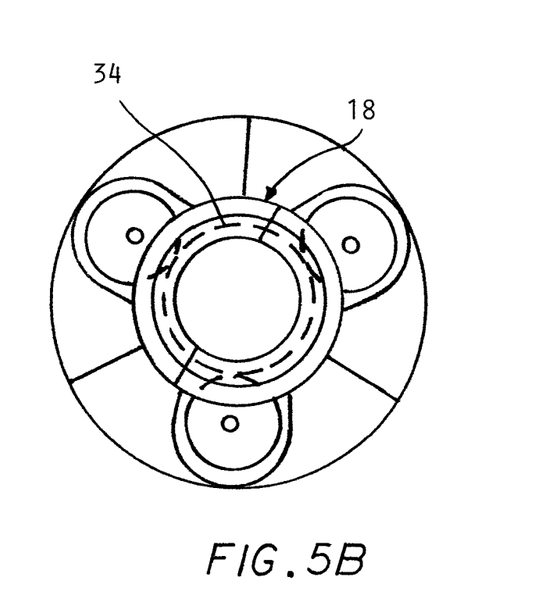
FIG. 5B is an end view of an inner ring included in a spinner according to the invention.

As seen in FIG. 3, the roller wheels 26A-26C each slightly protrude out of the chamber 24A-24C, to a sufficient degree so as to be able to enter a peripheral groove 30 defined between two centrally located flanges 32 on the spinner hub 18 and to roll on the outer diameter 34 of the hub within the groove 30 (FIG. 5A).

Molded in vents 36 allow moisture and debris to exit the chambers 24A-24C to keep the chambers 24A-24C clear and allow free rolling motion of the wheels 26A-26C.

The roller wheels 26A-26C provide rotational support for the spinners 10 without requiring conventional ball or roller bearings the use of which would require removable caps to secure the bearings in position, thus simplifying removal and replacement of the spinners 10.

Figure 7:
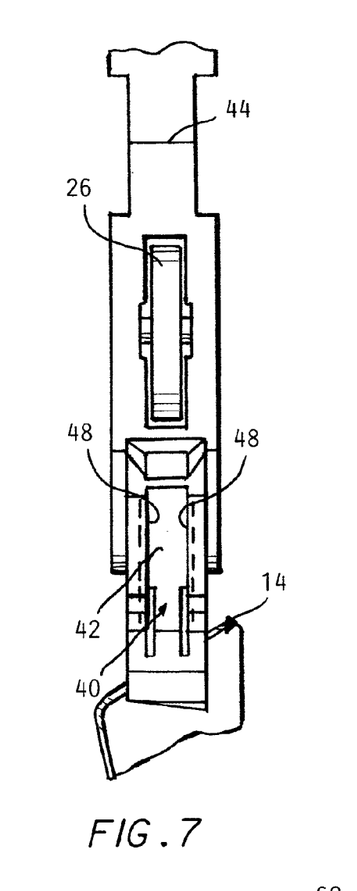
FIG. 7 is a greatly enlarged view of a key seat formed in an abutting side of a spinner inner ring segment.

In the first embodiment of a spinner according to the invention, the segments 16A, 16B, 16C are held together with small keys 38 which are received in a keyway 40 defined by two spaces 42 recessed into each of the abutting sides 44 (FIG. 8) between mating inner ring segments 16A-16C.

Figure 8:
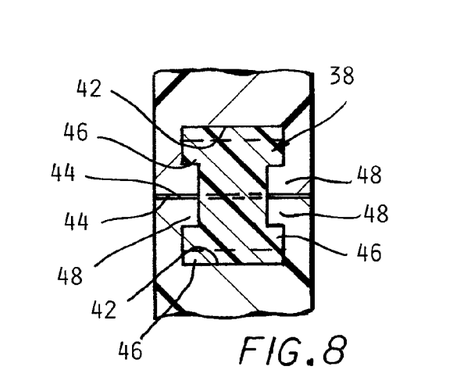
FIG. 8 is a sectional view through a key and key way used to couple the spinner inner ring segments.
Figure 9:
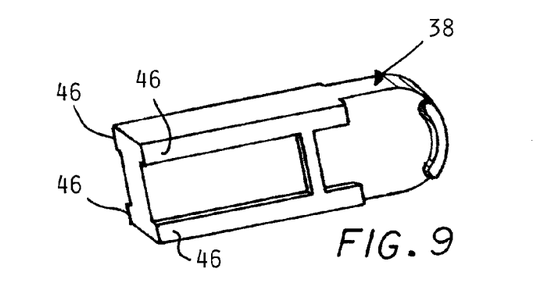
FIG. 9 is a pictorial enlarged view of a key used to connect the spinner segments.

The keys 38 have raised sides 46 which are captured by raised walls 48 on sides of the keyways 40 when the keys 38 are slid into the space between the two facing keyways 40.

Figure 6:
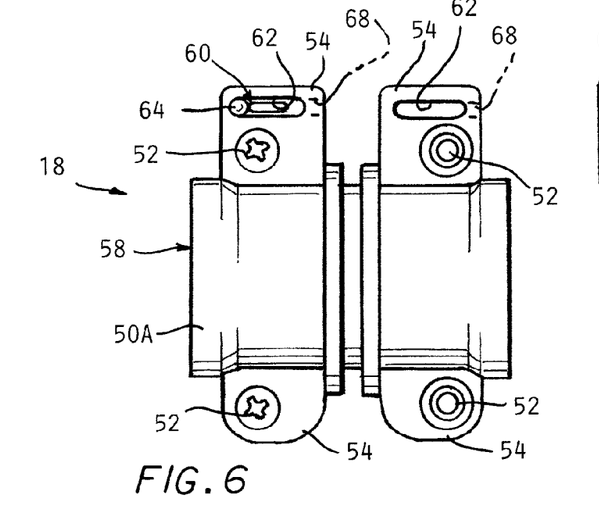
FIG. 6 is a further enlarged front view of the spinner hub shown in FIG. 5.
Figure 6A:
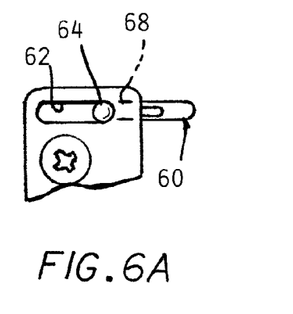
FIG. 6A is a fragmentary view of the spinner hub shown in FIG. 6 with a locking pin advanced to lock the spinner to the spinner hub.

The spinner hub 18 details are shown in FIGS. 5, 6 and 6A. FIG. 5 shows the two part construction in which two halves 50A, 50B are held together by screws 52 are advanced through one tab 54 and into an abutting other tab 56 both integrally molded with the main body 58.

A slidable locking mechanism 60 is disposed with aligned slots 62 in tabs 54, 56. An operator pin 64 projects out of the slot 62 while a connected locking pin 66 can be advanced out of a hole 68 as shown in FIG. 6A.

The locking pin 66 may enter one of a series of cavities 70 molded into an opposing face each segment 16A-16C of the inner ring 16. This allows selective locking of the hub 18 to the inner ring 16 so that the spinner 10 rotates with the bicycle wheel. When the operator pin 64 is withdrawn, the spinner 10 can rotate independently of the hub 18 and wheel 12A or 12B to which it is connected.

Figure 10:
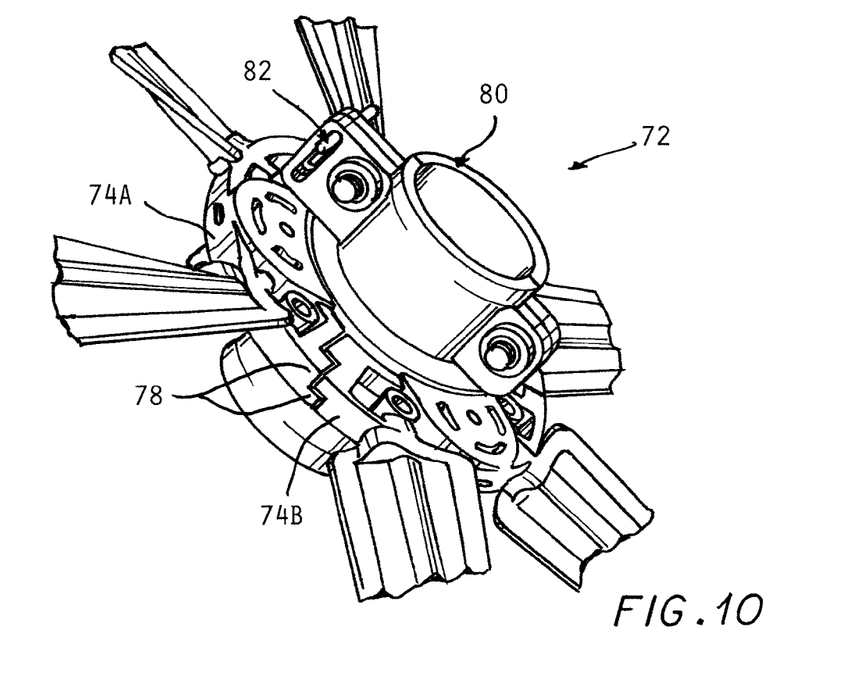
FIG. 10 is a further enlarged fragmentary pictorial view of the assembled spinner and spinner hub according to an alternate embodiment adapted to be attached to a front wheel hub.
Figure 11:
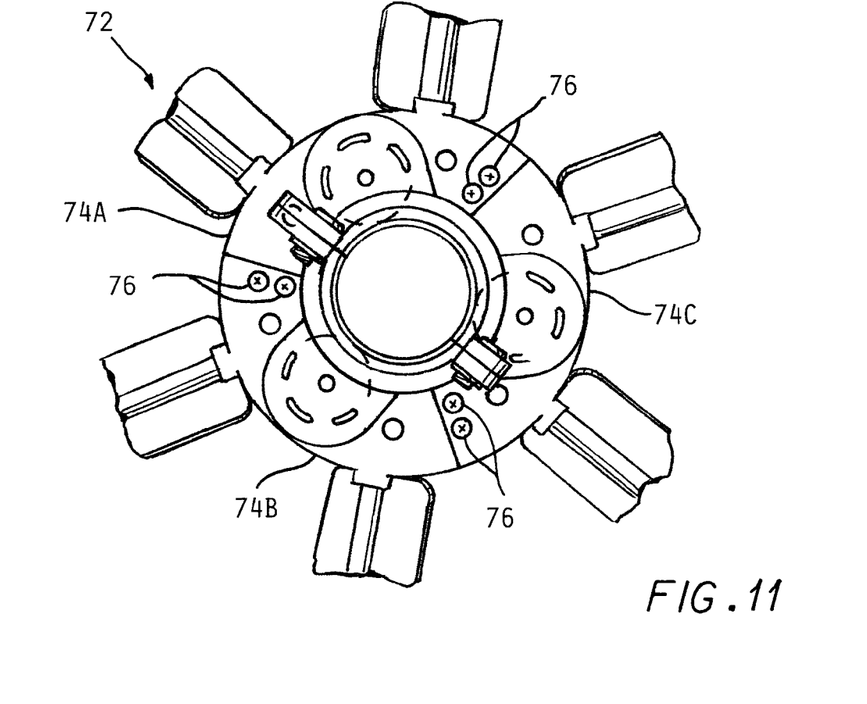
FIG. 11 is an end view of the spinner and spinner hub shown in FIG. 10.

Referring to FIGS. 10 and 11, in a second embodiment of a spinner 72, the spinner inner ring segments 74A, 74B, 74C are held together by pairs of screws 76 passing through interfit steps 78 formed at the overlapping at the adjacent sides of the segments 74A, 74B, 74C. This provides a more secure connection than the keyed connection of the first embodiment.

Figure 12:
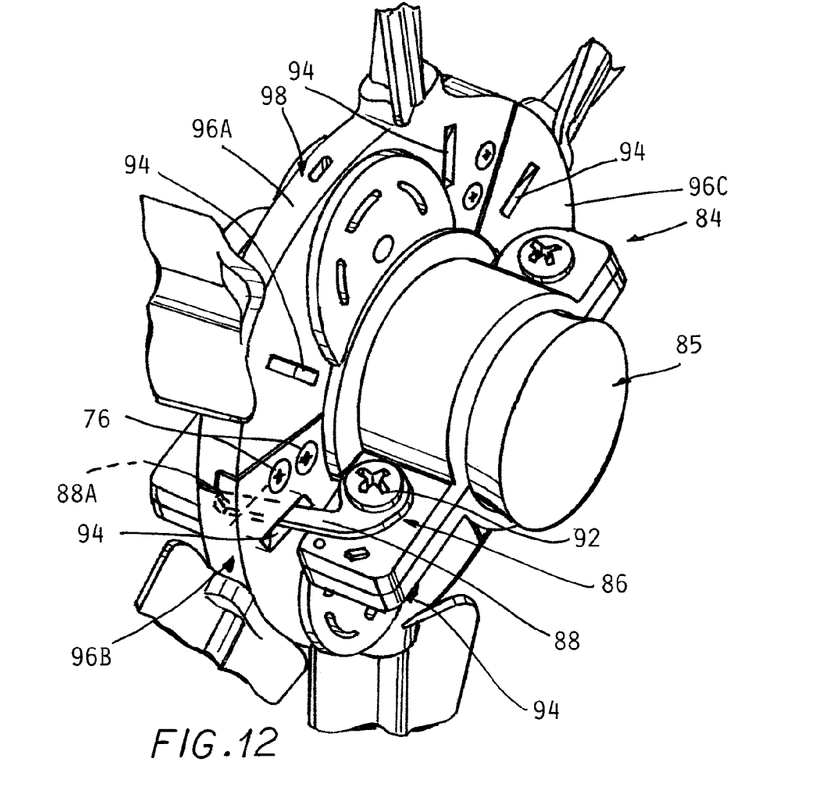
FIG. 12 is an enlarged pictorial view of an embodiment of a spinner assembly adapted to be mounted to a rear wheel hub using an alternate spinner lock.
Figure 13:
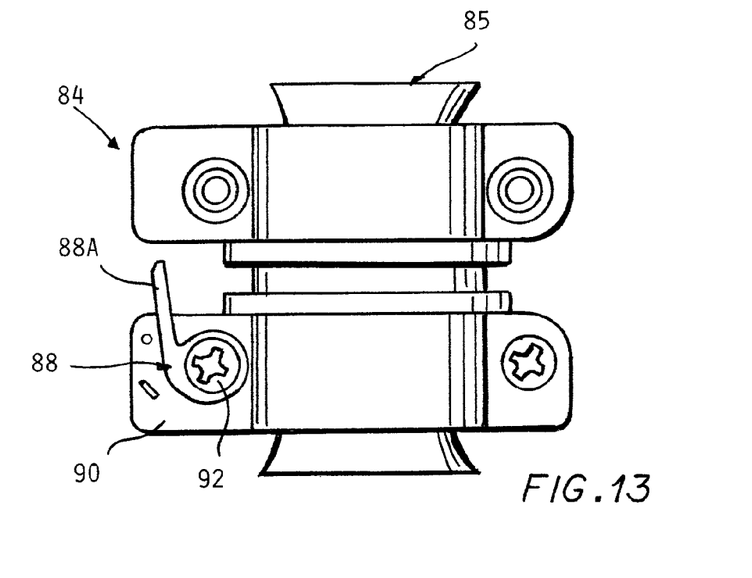
FIG. 13 is an enlarged top view of a spinner hub included in the spinner assembly shown in FIG. 12.

The spinner hub 80 and locking mechanism is the same for a front bicycle wheel. A rear wheel version of the second embodiment is shown in FIGS. 12, 13, in which a modified spinner hub 84 is used to match a rear bicycle wheel hub 85 as shown.

A different locking mechanism 86 is used comprised of an angled locking element 88 secured to one of the sets of hub flanges 90 with a portion extending under a screw 92 securing the flanges 86 together. The free end 88A can be inserted into one of a series of slots 94 formed into each of the faces of the inner ring 98 segments 96A, 96B, 96C.

Figure 14:
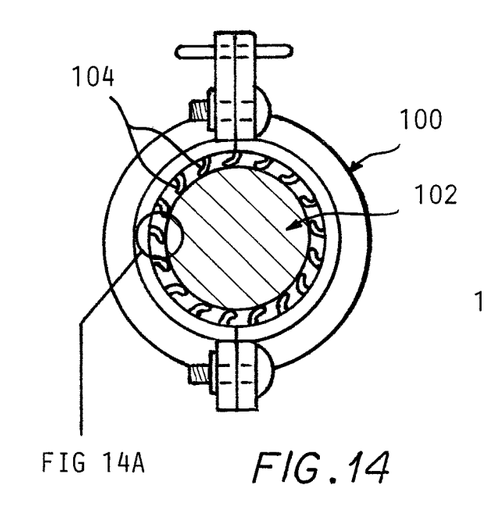
FIG. 14 is an end view of an optional version of a spinner hub.
Figure 14A:
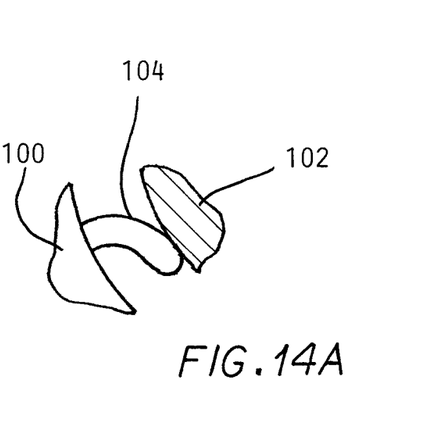
FIG. 14A is an enlarged fragmentary partially sectional view of the spinner hub shown in FIG. 14.

FIGS. 14 and 14A show an arrangement for adapting a spinner hub 100 to varying sizes of a bicycle wheel hub 102.

The arrangement comprises an array of flexible elements 104 molded in the inner diameter of the spinner hub 100.

The elements extend inwardly in a radial direction but are curved over to have the ends thereof extending generally tangentially to engage an outer diameter of the bicycle hub 102. The extent of curvature varies with the diameter of the bicycle hub 102 to thus be able to fit a range of hub diameters.

The spinner hub can also be integrated with the bicycle hub by configuring a bicycle hub to leave a groove for the roller wheels and/or the locking mechanism.

The invention claimed is:

1. A bicycle wheel spinner adapted to be mounted to a hub of a bicycle wheel, said spinner including an inner ring having an array of spinner blades, said spinner being formed in a plurality of segments, each segment forming a part of said inner ring with a corresponding number of blades formed as a part thereof, each of said inner ring segments having radial ends abutting and readily releasably connected to each other to form a complete inner ring, each segment inner ring portion formed with a hollow chamber open to the inside of said inner ring portion and having a roller wheel rotatably mounted therein, the outer perimeter of each roller wheel protruding radially in from said chamber; a central circumferential groove formed in said hub and entered into by said protruding roller wheel portion which also engages a bottom of said groove to rotatably support said spinner wheel on said hub, with sides of said groove confining said spinner axially on said hub, whereby said spinner wheel can be detached by releasing said connection between said inner ring segments and withdrawing said wheels from said groove.

2. The spinner according to claim 1 wherein said releasable connection comprises overlapping portions of said inner ring segments attached together with fasteners.

3. The spinner according to claim 1 wherein said releasable connection comprises a recessed opening formed into abutting faces of said ends of adjacent inner ring portions to jointly form a keyway and key pieces radially inserted into said keyway with mating features on said key pieces and keyway surfaces holding said inner ring segments together.

4. The spinner according to claim 1 further including a locking mechanism on said hub comprised of a locking element slidable axially in a bore in a radial part of said hub to be advanced into a cavity on said inner ring and to be moved out of said cavity to cause said spinner to be selectively locked to said hub and wheel or to be released therefrom.

\* \* \* \* \*